(12) United States Patent
Downey et al.

(10) Patent No.: US 8,726,314 B2
(45) Date of Patent: May 13, 2014

(54) SYSTEM AND METHOD FOR EXTENDING RECORDING TIME FOR A DIGITAL VIDEO RECORD (DVR)

(75) Inventors: William S. Downey, Franklin, MA (US); Ronald J. Parrino, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 419 days.

(21) Appl. No.: 12/342,211

(22) Filed: Dec. 23, 2008

(65) Prior Publication Data

US 2010/0162305 A1   Jun. 24, 2010

(51) Int. Cl.
*G06F 3/00* (2006.01)
*G06F 13/00* (2006.01)
*H04N 5/445* (2011.01)

(52) U.S. Cl.
USPC .................................. 725/50; 725/58; 725/93

(58) Field of Classification Search
USPC ................................................ 725/50, 58, 93
See application file for complete search history.

(56) References Cited

U.S. PATENT DOCUMENTS

| 7,080,396 | B2* | 7/2006 | Gong | 725/50 |
| 7,870,190 | B2* | 1/2011 | Takakura et al. | 709/203 |
| 2001/0011374 | A1* | 8/2001 | Lerman et al. | 725/92 |
| 2003/0028882 | A1* | 2/2003 | Davis et al. | 725/44 |
| 2004/0003403 | A1* | 1/2004 | Marsh | 725/53 |
| 2004/0031053 | A1* | 2/2004 | Lim et al. | 725/86 |
| 2008/0285943 | A1* | 11/2008 | Wang et al. | 386/83 |
| 2009/0293113 | A1* | 11/2009 | Foti | 726/12 |
| 2010/0215341 | A1* | 8/2010 | Ellis et al. | 386/83 |

* cited by examiner

*Primary Examiner* — Nnenna Ekpo (57) ABSTRACT

A system and method for extending recording time over an allocated time slot for a A/V recording device including receiving, at a programming content server, a request for one or more programs and transmitting, via the programming content server, the request for one or more programs to at least one of a linear content system and a digital content system. Also, the system and method may include receiving, at the programming content server, the one or more requested programs from at least one of the linear content system and the digital content system; and transmitting, via the programming content server, one or more programming content identification messages to a set-top box in the event that the one or more requested programs extend over an allocated time slot.

19 Claims, 4 Drawing Sheets

SYSTEM AND METHOD FOR EXTENDING RECORDING TIME FOR A DIGITAL VIDEO RECORD (DVR)

BACKGROUND INFORMATION

Due to advances in technology, television-watching has evolved into a multimedia experience. For example, viewers may now watch TV in high-definition on a large flat-screen with stereo surround sound in the comfort of their homes. Also, viewers may select to view from an ever increasing variety of TV content catered specifically to the preferences of each viewer. Viewers may select from an electronic program guide to find and watch desired programs without bulky paper-bound guides. In particular, audio/video (A/V) recording devices, such as, digital video recorders (DVRs), have become increasingly popular. The DVRs may allow viewers to record programs and watch the recorded programs at a later time, at the viewers' leisure. However, there are several drawbacks associated with the conventional DVRs. First, conventional DVRs may record scheduled broadcast programs for an allocated time slot. In the event that scheduled broadcast programs may extend over an allocated time slot, the DVRs may not record the entire scheduled broadcast programs. For example, during a sports event, such as a baseball game, the baseball game may go to extra innings and may extend over its allocated time slot, therefore DVRs may not record the extra innings because the baseball game extended over its allocated time slot. Thus, viewers may not watch the baseball game in its entirety because the DVRs stopped recording the baseball game at the end of the allocated time slot. Second, current DVRs may record a program based on a schedule (e.g., specific time slots) of broadcast video program provided by an electronic programming guide (EPG) associated the DVRs, set-top boxes, and/or display devices. Because EPG may not dynamically adjust to the schedule of the broadcast programs, therefore, DVRs may stop recording at an original stoppage time and will not continue recording if the broadcast programs may extend beyond its allocated time slot.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

These and other embodiments and advantages will become apparent from the following detailed description, taken in conjunction with the accompanying drawings, illustrating by way of example the principles of the various exemplary embodiments.

DETAILED DESCRIPTION OF EMBODIMENTS

An exemplary embodiment provides a recording system and process for extending recording time of an audio/video (A/V) recording device (e.g., digital video recorders (DVRs), personal video recorders (PVRs) and/or other semiconductor memory storage device). The recording system may provide one or more programs identification message to the A/V recording device in order to extend recording time over an allocated time slot for a program (e.g., television programs, sporting events, video game, movies, and/or other programs provided by the service provider 108, linear content system 112 and/or digital content system 116). For example, the programming content identification message may be provided by programming content providers in order to extend recording time over an allocated time slot of the DVRs. Also, the programming content identification message may be provided by service providers to a plurality of customers associated with the service providers. In an exemplary embodiment, in the event that a program (e.g., video-on-demand content) may extend over the allocated time slot of the program, the programming content providers and/or the service providers may provide one or more programming content identification messages to a set-top box associated with a viewer. The recording system may provide the programming content identification message to the electronic programming guide (EPG) in order to update an allocated time slot of a program. The A/V recording device may adjust recording time of a program based at least in part on the updated electronic programming guide. Also, the recording system may provide the programming content identification message to the DVRs in order to extend the recording time of an allocated time slot for a program. The DVRs may extend an allocated time slot for a program based at least in part on the programming content identification message. Also, the recording system may be supported by an Internet protocol (IP) network. The recording system may receive radio frequency (RF)-tuned linear content and Internet Protocol (IP) based content (e.g., video on-demand content and/or other digital content) on a single transmission path or disparate transmission paths. The recording system may provide a mechanism for DVRs to extend recording time over an allocated time slot in order to record a program in its entirety.

The description below describes a recording system, service providers, display devices, set-top boxes, A/V recording devices, an electronic programming guide (EPG) and other elements for extending recording time over an allocated time slot for program that may include one or more modules, some of which are explicitly depicted, others of which are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, etc.) separately. The functions described as being performed at various components may be performed at other components, and the various components may be combined and/or separated. Other modifications also may be made.

Figure 1:
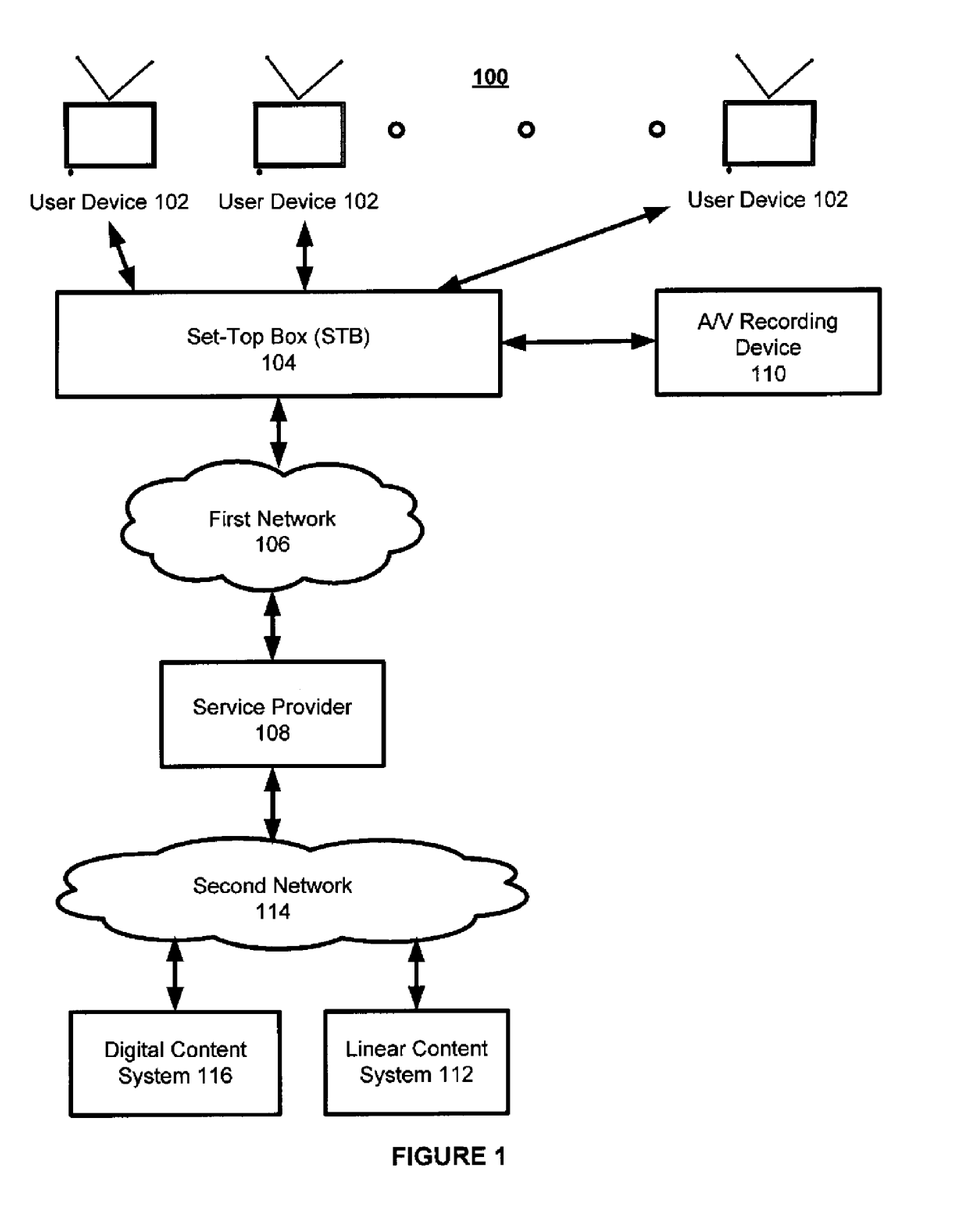
FIG. 1 illustrates an exemplary system for extending recording time over an allocated time slot for an A/V recording device, according to an embodiment.

FIG. 1 is a system 100 for extending recording time over an allocated time slot of an A/V recording device, according to an exemplary embodiment. As illustrated, a set-top box (STB) 104 may be communicatively coupled to one or more display devices 102 and/or an A/V recording device. The set-top box 104 may be communicatively coupled to a service provider 108 via a first network 106. The service provider 108 may be communicatively coupled to a linear content system 112 and/or a digital content system 116 via a second network 114. For example, the first network 106 and/or the second network 114 may be a single network having one or more linear subnetworks and/or one or more digital subnetworks, however, one having ordinary skill in the art would appreciate that the first network 106 and/or the second network 114 may be disparate networks having one or more linear subnetworks and/or one or more digital subnetworks. For example, the recording system 100 may deliver programming content identification message (e.g., via specific information protocol (PSIP), electronic programming guide (EPG), and/or data personal identifier (PID)) provided by the service provider 108, the linear system 112, and/or the digital content system 116 to the A/V recording device 110. In the event that the identification message is provided by the linear system 112 and/or the digital content system 116, the service provider 108 may modify (e.g., add information to, subtract and/or extract information from) the identification message. The one or more viewers may preset the A/V recording device 110 to record one or more programs (e.g., television programs, sporting events, video game, movies, and/or other programs provided by the service provider 108, linear content system 112 and/or digital content system 116) during an allocated time slot for each of the program. In the event that a program may extend over the allocated time slot, the service provider 108, the linear content system 112, and/or the digital content system 116 may provide one or more programming content identification messages to the A/V recording device 110 via the set-top box 104 and/or the first network 106. The programming content identification messages may inform the A/V recording device 110 that the program may be extended over the allocated time slot and/or to continuously record the program over the allocated time slot. The A/V recording device 110 may record the program over the allocated time slot based at least in part on the one or more programming content identification messages. Upon the termination of the program, the service provider 108, the linear content system 112, and/or the digital content system 116 may provide one or more programming content termination messages to the A/V recording device 110 to terminate the recording of the program. In another exemplary embodiment, upon the termination of the program, the service provider 108, the linear content system 112, and/or the digital content system 116 may provide one or more programming duration message to the A/V recording device 110 to indicate a change of the duration of the program.

The A/V recording device 110 may be integrated, coupled to or associated with the set-top box 104. For example, A/V recording device 110 may be an external device that may be connected to and/or communicatively coupled with the set-top box 104. The A/V recording device 110 may be an external device connected to the set-top box 104 via an interface port which may include, without limitation, USB ports, system bus ports, Firewire ports, cable ports, and/or other interface ports to couple the A/V recording device 110 to the set-top box 104. In another exemplary embodiment, the A/V recording device 110 may be an external device wirelessly communicatively coupled to the set-top box 104. For example, the A/V recording device 110 may be communicatively coupled to the set-top box 104 via a local area network (LAN). The local area network (LAN) may include, but is not limited to, infrared, Bluetooth™, radio frequency (RF), and/or other networks of wireless communication. In other exemplary embodiments, the A/V recording device 110 may be integrated with the set-top box 104. Further, computer code may be stored in a storage medium associated with the set-top box 104 to control and/or operate the A/V recording device 110.

The display device 102 may display one or more programs (e.g., linear content and/or digital content). The display device 102 may be a television set, for example. The display device 102 also may be other devices capable of displaying video, such as, but not limited to, computer monitor, liquid crystal display (LCD), cathode ray tube (CRT), rear projection television (RPTV), flat panel television, plasma display, surface-conduction electron-emitter display (SED), video projector, light-emitting diode, organic light-emitting diode (OLED) and/or other similar display devices for displaying television content. Also, the display device 102 may include, but not limited to, a computer, a personal computer, a laptop, a cellular communication device, a workstation, a mobile device, a phone, a handheld PC, a personal digital assistant (PDA), a thin system, a fat system, a network appliance, an Internet browser, a paging, an alert device, and/or other any other devices for displaying and/or provide audio for television programs.

The set-top box 104 may be an integrated receiver/decoder (IRD) device and/or a small computer that may communicatively couple the display device 102 to the service provider 108. The set-top box 104 may receive and/or process an external signal and couple the external signal to the display device 102. In an exemplary embodiment, the set-top box 104 may be communicatively coupled to, integrated and/or associated with the display device 102. The set-top box 104 may be a digital video recorder, a converter, or other device capable of coupling an external signal source to the display device 102. The set-top box 104 may communicatively couple an external signal source from an Ethernet cable, a satellite dish, a coaxial cable, a telephone line, a broadband over power line, a very high frequency antenna, ultra high frequency antenna and/or other external signal source to transmit a signal to the display device 102. The set-top box 104 and the display device 102 may be a single device, instead of two separate devices, as shown.

The first network 106 and/or the second network 114 may be a wireless network, a wired network or any combination thereof that may couple the set-top box 104, the service provider 108, the linear content system 112, and/or the digital content system 116. The first network 106 and/or the second network 114 may be a communication network to enable Internet protocol (IP) content (e.g., video on-demand content and/or other digital content) having real-time streaming protocol (RTSP) and/or specific information protocol (PSIP) capabilities. Also, the first network 106 and/or the second network 114 may be a communication network that may enable radio frequency (RF) transmission. For example, the first network 106 and/or the second network 114 may include, but is not limited to, telephone line, fiber optics, IEEE Ethernet 802.3, wide area network (WAN), local area network (LAN), and/or global network such as the Internet. Also, the first network 106 and/or the second network 114 may include, but is not limited to, wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802:11n and 802.11g and/or other wireless network for deliver content and enable communication between the set-top box 104, the service provider 108, the linear content system 112, and/or the digital content system 116. In addition, the first network 106 and/or the second network 114 may enable, a wireless communication network, a cellular network, an Intranet, or the like, or any combination thereof. The first network 106 and/or the second network 114 may further include one, or any number of the exemplary types of networks mentioned above operating as a stand-alone network or in cooperation with each other.

The service provider 108 may include a radio company, a cable company (e.g., Cox Communication, Comcast Corp, or Adelphia Communication Corp), a satellite company (e.g., DirecTV or Dish Network), a broadcasting company (e.g., National Broadcasting Company (NBC), American Broadcasting Company (ABC), Fox Broadcasting Company (FOX), or Columbia Broadcasting System (CBS)) and/or other programming content providers. Also, the service provider 108 may include, but is not limited to, a SQL Server, UNIX based servers, Windows 2000 Server, Microsoft IIS server, Apache HTTP server, API server, Java sever, Java Servlet API server, ASP server, PHP server, HTTP server, Mac OS X server, Oracle server, IP server, and/or other servers to provide linear content and/or digital content to the set-top box 104. Also, the service provider 108 may store and/or run a variety of software, for example, Microsoft .NET framework.

As described above, the A/V recording device 110 may be integrated, coupled to or associated with the set-top box 104. The A/V recording device 110 may record audio and/or video content to a storage device (e.g., databases). The A/V recording device 110 may be digital video recorders (DVRs) and/or personal video recorders (PVRs). Also, the A/V recording device 110 may be hard disk-based DVRs, dual-tuner DVRs, PC-based DVRs (e.g., Linux, Mac OS, and/or Windows). The A/V recording device 110 may include, but not limited to, a portable media players (PMP), and/or other software for personal computers for capturing audio and/or video content and play back to and/or from disks.

Figure 2:
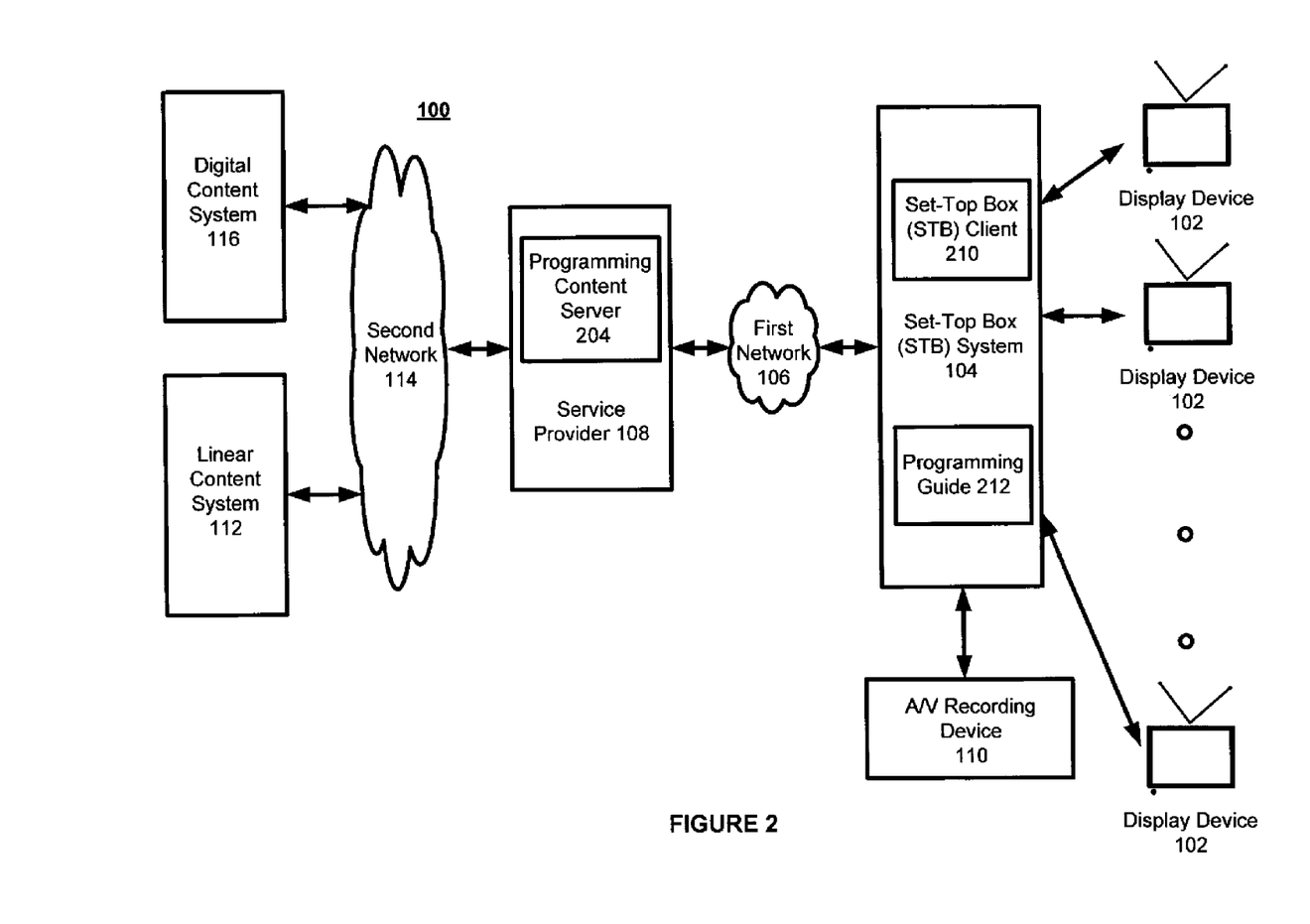
FIG. 2 illustrates a detailed exemplary system for extending recording time over an allocated time slot for an A/V recording device, according to an embodiment.

FIG. 2 illustrates a detailed view of the recording system 100 for extending recording time over an allocated time slot of an A/V recording device, according to an exemplary embodiment. As discussed above, the set-top box 104 may be communicatively coupled to the display device 102 and/or the A/V recording device 110. The set-top box 104 may include a set-top box client 210 and/or a programming guide 212. Also, the service provider 108 may be communicatively coupled to the set-top box 104, the linear content system 112, and/or the digital content system 116. For example, the service provider 108 may include a programming content server 204.

The one or more viewers may tune to the linear content system 112 and/or the digital content system 116 and may receive programs (e.g., linear content and/or digital content), via the programming content server 204 of the service provider 108 via the second network 114. For example, the linear content may be radio frequency (RF)-tuned content offered by, for example, National Broadcasting Company (NBC), Fox Broadcasting Company (FOX), American Broadcasting Company (ABC), Columbia Broadcasting System (CBS) and/or other radio frequency (RF)-tuned linear content providers. Also for example, the digital content may include, but is not limited to, a video on-demand (VOD) session and/or other digital content. For example, one or more viewers may request a movie and/or a television program from a video on-demand session (e.g., Batman the movie and/or a sporting event).

The programming content server 204 may provide the programs to the one or more viewers via the set-top box 104. For example, one or more viewers may request a food cooking program and the programming content server 204 may provide the requested food cooking program to the one or more viewers via the set-top box 104 and/or the display device 102. Also, the programming content server 204 may replicate the linear content and/or the digital content and provide copies of the replicated linear content and/or digital content to the one or more viewers via the display devices 102. For example, one or more viewers may not be available to watch a program during a pre-scheduled time slots. The one or more viewers may select to record one or more programs via the A/V recording device 110. In an exemplary embodiment, the A/V recording device 110 may record the programs based at least in part on an electronic programming guide. In other exemplary embodiments, the viewers may preset the recording time of the A/V recording device 110 based at least in part on the duration of the programs.

Further, the programming content server 204 may buffer programs for a predetermined amount of time. For example, one or more viewers may request programs and the programs may be filmed (e.g., taping of a show and/or live direct feed of a show from Pacific Standard Time (PST)) at a different time zone than the requesting one or more viewers (e.g., Eastern Standard Time (EST)). In addition, the programming content server 204 may delay the availability of the program to the requesting viewers. The delay of the availability of the program may depend on the time difference between the filming location of the program and the requesting one or more viewers and/or a predetermined viewing time of the program in accordance with the programming guide 212. For example, the programs may be filmed at London which may be five or six hours ahead of a requesting viewer located in the Eastern Standard Time (EST) zone. The programming content server 204 may store the programs for five or six hours to synchronize the broadcasting time between London time and the Eastern Standard Time (EST). Furthermore, the programming content server 204 may store the programs for a predetermined amount of time. For example, programs may be stored in the programming content server 204 for twelve hours, twenty-four hours or a week where one or more viewers may request the programs multiple times. In addition, the programming content server 204 may archive programs for record keeping. For example, the programming content server 204 may provide permanent storage of the programs for record keeping.

Moreover, the programming content server 204 may provide live feed of the programs to one or more viewers. For example, the one or more viewers may request the live feed of the programs from the linear content system 112 and/or the digital content system 116. The programming content server 204 may transfer the request for programs to the linear content system 112 and/or the digital content system 116. The linear content system 112 and/or the digital content system 116 may provide the requested programs to the one or more requesting viewers via the programming content server 204. Also, in the event that no viewers may request the live feed of the programs and the live feed of the programs may not be stored at the programming content server 204 and the live feed may be deleted and/or discarded. For example, the linear content system 112 and/or the digital content system 116 may provide one or more programming content identification messages (e.g., via a specific information protocol (PSIP) in a programming content data stream) associated with the requested programs to the programming content server 204. For example, the one or more programming content identification messages may include, but is not limited to, a name, a channel, a date, a start time, duration, extension time, identification information, a description, and/or other information associated with one or more programs. The linear content system 112 and/or the digital content system 116 may provide the programming content identification messages during transmission of the requested programs. The linear content system 112 and/or the digital content system 116 may provide the programming content identification messages to the programming content server 204 continuously and/or intermittently. For example, the linear content system 112 and/or digital content system 116 may provide the programming content identification messages to the programming content server 204 every second, minute, or hour. Also, the linear content system 112 and/or digital content system 116 may provide one or more programming content identification messages to the programming content server 204 in the event that the requested programs may extend over an allocated time slot. The programming content server 204 may provide the one or more programming content identification messages to the set-top box 104. Also, the linear content system 112 and/or digital content system 116 may provide one or more programming content termination message to the programming content server 204 in the event that the requested programs ends. The programming content server 204 may provide the one or more programming content termination messages to the set-top box 104.

In other exemplary embodiments, the programming content server 204 may generate one or more programming content identification messages associated with a program and the programming content server 204 may provide the one or more programming content identification messages to the set-top box 104. The programming content server 204 may provide the programming content identification messages to the set-top box 104 (e.g., via program specific information protocol (PSIP) in a programming content data stream) during one or more requested programs. The programming content server 204 may provide the programming content identification messages to the set-top box 104 continuously and/or intermittently. For example, the programming content server 204 may provide the programming content identification messages to the set-top box 104 every second, minute, or hour. Also, the programming content server 204 may provide one or more programming content identification messages to the set-top box 104 in the event that the requested programs may extend over an allocated time slot. Also, the programming content server 204 may provide one or more programming content termination message to the set-top box 104 in the event that the requested programs end.

The programming content server 204 may determine a mapping (e.g., schedule associated with the programs) associated with the linear content and/or digital content provided by the linear content system 112 and/or the digital content system 116 to the programming content server 204. The programming content server 204 may include a computer readable storage media including code to control a function of the linear content system 112, the digital content system 116, the set-top box client 210 and/or the programming guide 212. The programming content server 204 may associate a channel and/or allocate a time slot with programs. For example, the programming content server 204 may associate channel 800 from 7 p.m. to 8 p.m. to a food cooking program. Also, the programming content server 204 may be in communication with the programming guide 212. The mapping information associated with the programs may be provided to the programming guide 212 by the programming content server 204 to be displayed to the one or more viewers. In addition, the programming content server 204 may associate identification information associated with the programs. For example, the programming content server 204 may associate a uniform resource locator to the programs. Also, the programming content server 204 may associate a content name, content time and/or other identification information for identifying the programs.

Further, the programming content server 204 may determine a storage time, buffer time and/or live feed associated with the programs. The programming content server 204 may determine a storage time associated with the programs and/or an archive time of the programs. Also, the programming content server 204 may determine a time delay and/or a buffer time associated with programs. Further, the programming content server 204 may determine a live feed associated with the programs. Furthermore, the programming content server 204 may determine a reception characteristics associated with programs from the linear content system 112 and/or the digital content system 116 to the programming content server 204. For example, the programming content server 204 may determine a storage time and/or a buffer time of programs upon reception of such programs.

Moreover, the programming content server 204 may receive a request for programs from one or more viewers via a remote control device (not shown) associated with the set-top box 104. The programming content server 204 may receive a request for programs from the set-top box client 210. The programming content server 204 may provide the viewer's request from the set-top box 104 to the linear content system 112 and/or the digital content system 116. For example, one or more viewers may request a program, the programming content server 204 may provide the viewer's request to the linear content system 112 and/or the digital content system 116. Also, the programming content server 204 may access the linear content system 112 and/or the digital content system 116 based at least in part on the viewer's request. The programming content server 204 may further determine a transmission associated with programs from the linear content system 112 and/or the digital content system 116 to one or more viewers based at least in part on the viewer's request. For example, the programming content server 204 may determine the transmission path, bandwidth, frequency, carrier wave and/or other transmission characteristics associated with the transmission of the programs to the one or more viewers.

Further, the set-top box 104 may identify the requested programs. For example, the set-top box 104 may receive a program request from one or more viewers. The one or more viewers requested program may be associated with a channel and/or an allocated time slot. The set-top box 104 may determine the viewer requested program may be a linear content or a digital content based at least in part on the channel and/or the allocated time slot associated with the viewer requested program. The set-top box client 210 of the set-top box 104 may receive the request for programs from one or more viewers. The set-top box client 210 may initiate a program session over the first network 106 (e.g., radio-frequency network, Internet protocol (IP) network). The set-top box client 210 may provide the request for the program to the programming content server 204. The set-top box client 210 may provide information associated with the requested program to the programming content server 204. The programming content server 204 may provide the requested program based at least in part on information associated with the program to the set-top box client 210. The information associated with the program may include, but is not limited to, a mapping of the programs, storage location of the programs, transmission channel, frequency, bandwidth and/or modulation of the programs and/or other information associated with the identification and/or transmission of the programs.

The set-top box client 210 may receive a request for programs from the A/V recording device 110. For example, one or more viewers may preset the A/V recording device 110 to record a program during an allocated time slot of the program. In an exemplary embodiment, the viewer may preset the A/V recording device 110 to record Game 7 of the Baseball World Series on channel 800 at 8 p.m. on Monday. The A/V recording device 110 may transmit a program request for the Game 7 of the Baseball World Series on Monday at 8 p.m. at channel 800 to the set-top box client 210. Subsequently, the set-top box client 210 may provide the program request to the programming content server 204. The programming content server 204 may provide the requested program to the A/V recording device 110 via the set-top box client 210. In an exemplary embodiment, the A/V recording device 110 may be preset to record the program for an allocated time slot. For example, the A/V recording device 110 may be preset to record Game 7 of the World Series for 3 hours. The set-top box client 210 may receive one or more programming content identification messages from the programming content server 204 in the event that the program may be extending over the allocated time slot. For example, the program of Game 7 of the Baseball World Series may be tied at the end of nine inning and goes to extra innings, the programming content server 204 may provide one or more programming content identification messages to the set-top box client 210. The set-top box client 210 may provide the one or more programming content identification messages to the A/V recording device 110 to indicate that the requested programs may be extending over the allocated time slot. The A/V recording device 110 may continue to record the requested programs based at least in part on the one or more programming content identification messages. Also, the A/V recording device 110 may extend a recording time of the requested programs for a predetermined time period (e.g., half an hour, an hour, two hours) based at least in part on the reception of the one or more programming content identification messages. At the end of the requested programs, the programming content server 204 may provide one or more programming content termination messages to the A/V recording device 110 via the set-top box client 210. The A/V recording device 110 may stop recording the requested programs based at least in part on the reception of the one or more programming content termination messages.

One or more viewers may obtain the channel information, time slot information and/or other programs information associated with the programs from the programming guide 212 assigned by the programming content server 204. The programming guide 212 may provide an electronic programming guide (EPG) to one or more viewers via the display device 112. In addition, the programming guide 212 may provide the electronic programming guide having one or more options. For example, one or more options associated with the electronic programming guide may include a date toolbar, time toolbar, program icons, actors, genres (e.g., family, kids' zone, movies, sports, or pay-per-view), title, channel, and/or other options to enhance a convenience of the electronic programming guide. Moreover, the programming guide 212 may provide one or more search options. For example, one or more search options associated with the electronic programming guide may include a keyword search, an actors/actress search, a title search, a channel search, a genre search, and/or other search options to facilitate a searching of the program schedule information. The programming guide 212 may include one or more databases to store program schedule information which may include a name, a channel, a date, a start time, duration, identification information, a description, and/or other information associated with one or more programs.

The programming guide 212 may utilize processor logic to identify programs schedule information to be displayed to a viewer. In another embodiment, the programming guide 212 may also include additional processing logic to sort and index the programs schedule information by, but is not limited to, at least one of the following: date, time, program information, programming categories, actors, genres (e.g., action, drama, family, movies, sports, pay-per-view, etc), title, channel, reviews, social network information, event/show statistics, broadcast duration, ratings, popularity, closed-captioning information, etc. Storing and indexing may be achieved by parsing the programs schedule information, which may be transmitted as searchable metadata.

The programming guide 212 may provide programs schedule information in an electronic programming guide to the display device 112. The programs schedule information may be an analog signal or a digital signal and may include audio signal, video signal, text signal and/or combinations thereof. The programs schedule information may be, for example, a cable television programming, a broadcasting television programming, a radio programming, or may be digitized audio content, video content, text content, etc., transported to the display device 102. In one embodiment, the programs schedule information may be received concurrently or non-concurrently with the programs from the linear content system 112 and/or the digital content system 116. In another embodiment, the programs schedule information may be received separately from a third party, another programs data source, or a combination thereof.

In an exemplary embodiment, the A/V recording device 110 may be set to record a program based at least in part on the programs schedule information contain in the electronic programming guide provided by the programming guide 212. For example, the electronic programming guide provided by the programming guide 212 may control a recording of a program by the A/V recording device 110. For example, the A/V recording device 110 may record the program based on the program schedule information in the electronic programming guide provided by the programming guide 212. For example, the electronic programming guide provided by the programming guide 212 may include the National Football League (NFL) Super Bowl scheduled for January 31, at 8 p.m. for three hours. The A/V recording device 110 may obtain the schedule information in the electronic programming guide provided by the programming guide 212 and record the Super Bowl. In an exemplary embodiment, the Super Bowl may be tied at the end of regulation, and may go into overtime, the programming content server 204 may provide one or more programming content identification messages to the programming guide 212. The programming guide 212 may update program schedule information in the electronic programming guide based at least in part on the one or more programming content identification messages. The programming guide 212 may update the program schedule information by extending the allocated time slot for the Super Bowl in the electronic programming guide. The A/V recording device 110 may extend the recording time of the Super Bowl based at least in part on the updated program schedule information in electronic programming guide. Also, the programming content server 204 may provide one or more programming content termination messages to the programming guide 212. The programming guide 212 may update the program schedule information in the electronic programming guide. The programming guide 212 may update a termination time of the programs in the electronic programming guide based at least in part on the programming content termination messages. The A/V recording device 110 may terminate recording of the requested programs based at least in part on the updated termination time in the electronic programming guide.

Figure 3A:
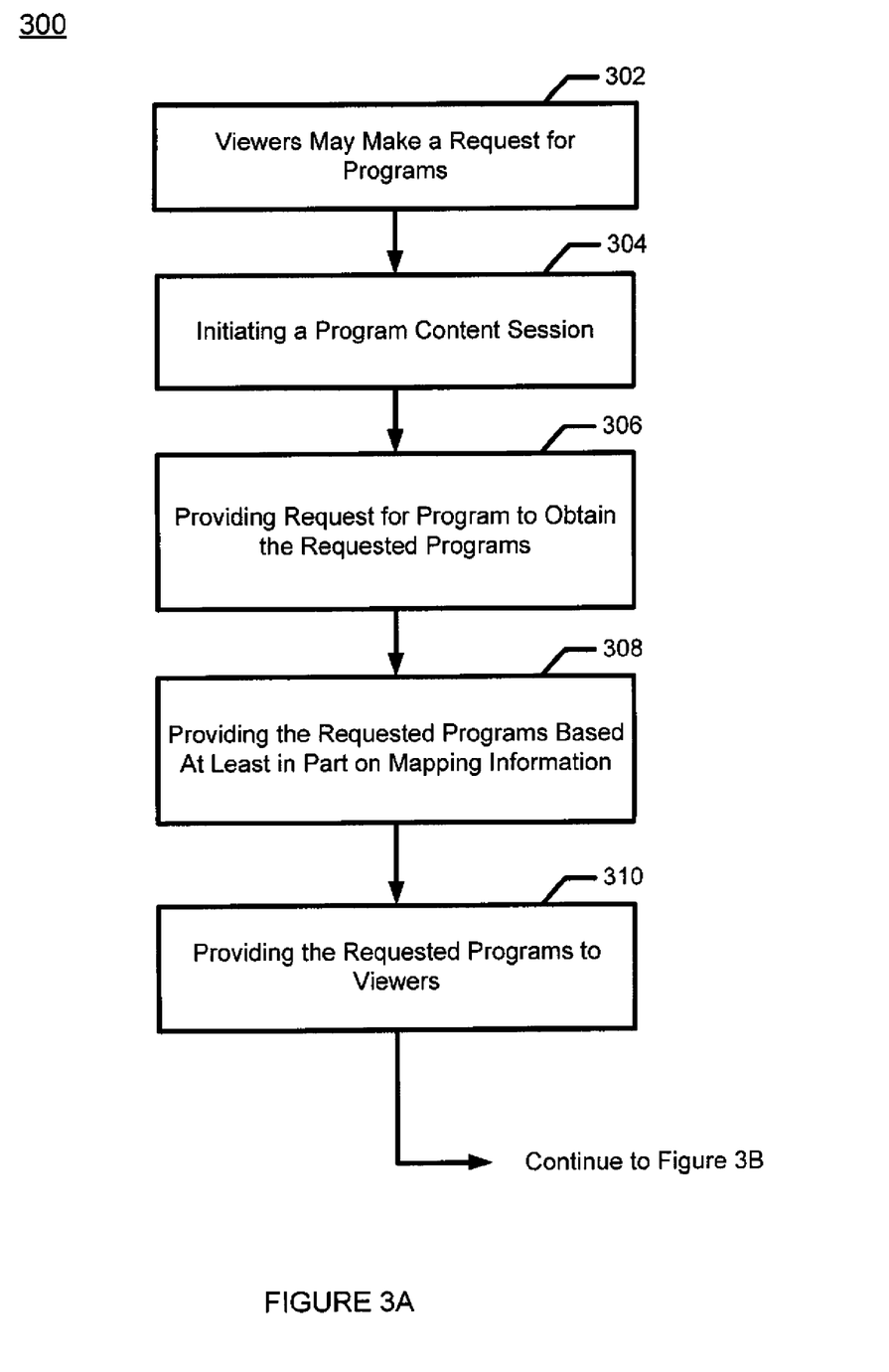
FIGS. 3A and 3B illustrate an exemplary flowchart of a method for extending recording time over an allocated time slot for an A/V recording device, according to an embodiment.
Figure 3B:
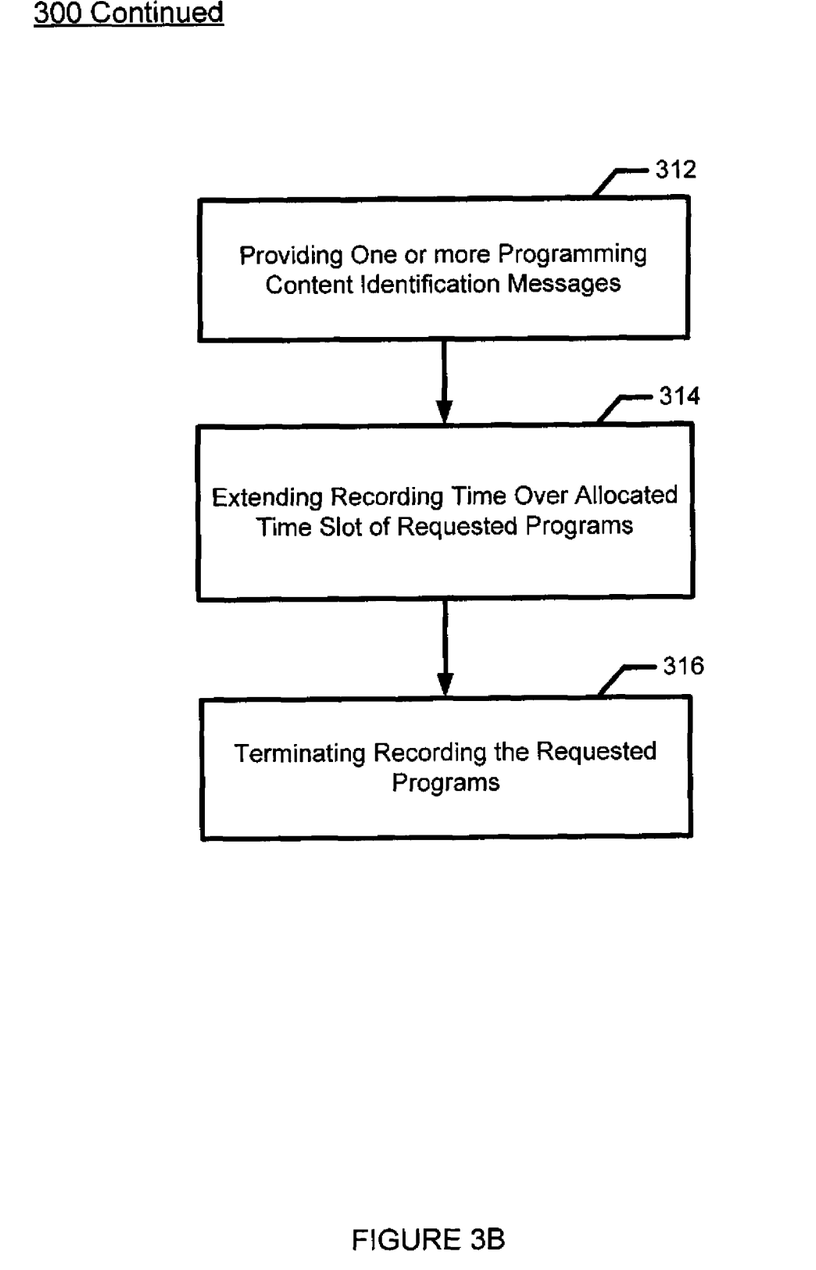

FIGS. 3A and 3B illustrate a flow diagram of a method 300 for extending recording time over an allocated time slot of an A/V recording device, in accordance with exemplary embodiment. This exemplary method 300 may be provided by way of example, as there are a variety of ways to carry out the method. The method 300 shown in FIG. 3 can be executed or otherwise performed by one or a combination of various systems. The method 300 is described below may be carried out by the recording system 100 shown in FIGS. 1 and 2, by way of example, and various elements of the recording system 100 are referenced in explaining the example method of FIG. 3. Each block shown in FIG. 3 represents one or more processes, methods or subroutines carried out in exemplary method 300. Referring to FIG. 3, exemplary method 300 may begin at block 302.

At block 302, one or more viewers may make a request for one or more programs. For example, a programming guide 212 may provide an electronic programming guide to the one or more viewers having programs schedule information, for example, a channel and/or time slot associated with the programs. Also, the electronic programming guide provided by the programming guide 212 may provide the one or more viewers a brief description of the programs and/or other information associated with identifying the programs. The set-top box client 210 may receive a request for programs from the viewers via a remote control device (not shown) associated with the set-top box 104 based at least in part on the programs schedule information of the electronic programming guide. In another exemplary embodiment, one or more viewers may preset an A/V recording device 110 by inputting a request for programs. For example, the viewers may preset an A/V recording device 110 to record a program during an allocated time slot of the program. Also, the viewer may preset the A/V recording device 110 to record one or more programs based at least in part on the programs schedule information provided by the electronic programming guide. After making a request for one or more programs, the method 300 may proceed to block 304.

At block 304, a program session may be initiated. For example, the set-top box client 210 may initiate a program session by providing the request for programs to a programming content server 204. The set-top box client 210 may provide programs information associated with initiating a program session to the programming content server 204. Also, A/V recording device 110 may provide a request for programs to the set-top box client 210. The set-top box client 210 may provide the request for programs to the programming content server 204. After initiating a program session, the method 300 may proceed to block 306.

At block 306, in response to receiving the request for programs, the request for programs may be provided to obtain the requested programs. For example, in response to receiving the request for programs, the programming content server 204 may transfer the request for programs to a linear content system 112 and/or a digital content system 116. The programming content server 204 may process the requested programs to identify the programs associated with the requested programs. Also, the programming content server 204 may identify and/or extract mapping information associated with the requested programs. For example, the mapping information associated with the programs may include a mapping of the programs, storage location of the programs, an identification information (e.g., uniform resource locator (URL)), transmission channel, frequency, bandwidth/modulation of the programs and/or other mapping information associated with transmission/reception of the programs. The programming content server 204 may provide the mapping information associated with the requested programs to the linear content system 112 and/or the digital content system 116. After transferring the request for programs in response to receiving the request for programs, the method 300 may proceed to block 308.

At block 308, the requested programs may be provided based at least in part on mapping information. For example, the linear content system 112 and/or the digital content system 116 may provide the requested programs based at least in part on mapping information received from the programming content server 204. The linear content system 112 and/or the digital content system 116 may process and/or determine the programs based at least in part on the mapping information received from the programming content server 204. For example, the linear content system 112 and/or the digital content system 116 may detect the mapping information associated with the programs. The linear content system 112 and/or the digital content system 116 may identify the requested programs and provide the requested programs to the programming content server 204. After providing the requested programs based at least in part on mapping information, the method 300 may proceed to block 310.

At block 310, the requested programs may be provided to one or more viewers. For example, the programming content server 204 may provide the requested programs to the set-top box 104 associated with one or more viewers. For example, the programming content server 204 may provide the requested programs to the set-top box client 210 to be displayed to the one or more viewers via one or more display devices 102. Also, the programming content server 204 may provide the requested programs to the set-top box client 210 and stored via the A/V recording device 110. After, providing the requested programs to one or more viewers, the method 300 may proceed to block 312.

At block 312, in the event that the requested programs may extend over an allocated time slot of the requested programs, one or more programming content identification messages may be provided. For example, the programming content server 204 may provide one or more programming content identification messages to the set-top box 104, in the event that the requested programs may extend over an allocated time slot. The linear content system 112 and/or the digital content system 116 may provide one or more programming content identification messages (e.g., via a specific information protocol (PSIP)) associated with the requested programs to the programming content server 204, in the event that the requested programs may extend over an allocated time slot. Also, the linear content system 112 and/or the digital content system 116 may provide the programming content identification messages to the programming content server 204 during the allocated time slot for the requested programs. Subsequently, the programming content server 204 may provide the one or more programming content identification messages to the set-top box 104. In other exemplary embodiments, the programming content server 204 may generate one or more programming content identification messages associated with the requested programs provided by the linear content system 112 and/or the digital content system 116, in the event that the requested programs may extend over an allocated time slot. The programming content server 204 may provide the programming content identification messages to the set-top box 104 during the allocated time slot for the requested programs. After, providing one or more programming content identification messages in the event that the requested programs may extend over an allocated time slot of the requested programs, the method 300 may proceed to block 314.

At block 314, extending recording time over the allocated time slot of the requested programs, based at least in part on the one or more programming content identification messages. For example, the A/V recording device 1 to may extend recording of the requested programs based at least in part on the one or more programming content identification messages. The A/V recording device 110 may be set to record the requested programs based at least in part on the programs schedule information contain in the electronic programming guide provided by a programming guide 212. The programming content server 204 may provide one or more programming content termination messages to the programming guide 212. The programming guide 212 may update programs schedule information provided by the electronic programming guide based at least in part on the one or more programming content identification messages. The programming guide 212 may extend the allocated time slot for the requested programs in the electronic programming guide. The A/V recording device 110 may extend the recording time of the requested programs based at least in part on the updated electronic programming guide. In other exemplary embodiments, the programming content server 204 may provide one or more programming content identification messages to the set-top box client 210 in the event that the programs may be extending over the allocated time slot. The set-top box client 210 may provide the one or more programming content identification messages to the A/V recording device 110 to indicate that the requested programs may be extending over the allocated time slot. The A/V recording device 110 may extend the recording time of the requested programs based at least in part on the one or more programming content identification messages. After extending recording the requested programs, based at least in part on the one or more programming content identification messages, the method 300 may proceed to block 316.

At block 316, terminate recording of the requested programs based at least in part on one or more programming identification termination message. For example, the A/V recording device 110 may terminate recording of the requested programs based at least in part on one or more programming identification termination message. For example, the linear content system 112 and/or digital content system 116 may provide one or more programming content termination message to the programming content server 204 in the event that the requested programs may terminate. The programming content server 204 may provide the one or more programming content termination messages to the set-top box 104. The programming guide 212 may update a termination time of the requested programs in the electronic programming guide based at least in part on the programming content termination messages. The A/V recording device 110 may terminate recording of the requested programs based at least in part on the updated termination time in the electronic programming guide. In other exemplary embodiments, the programming content server 204 may provide one or more programming content termination message to the set-top box client 210 of the set-top box 104 in the event that the requested programs may terminate. At the end of the requested programs, the set-top box client 210 may provide one or more programming content termination messages to the A/V recording device 110. The A/V recording device 110 may stop recording the requested programs based at least in part on the reception of the one or more programming content termination messages.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
receiving, at a programming content server, a request for one or more programs;
transmitting, via the programming content server, the request for one or more programs to at least one of a linear content system and a digital content system;
receiving, at the programming content server, the one or more requested programs from at least one of the linear content system and the digital content system;
transmitting, via the programming content server, one or more programming content identification messages to a set-top box in the event that the one or more requested programs extend over an allocated time slot, wherein the one or more programming content identification messages are transmitted during the allocated time slot of the one or more requested programs and indicates a change in the duration of the one or more requested programs, and wherein the one or more programming content identification messages are provided to a digital video recorder associated with the set-top box to modify a recording time of desired programming; and
transmitting, via the programming content server, one or more termination messages to the set-top box at a termination of the one or more requested programs, wherein the one or more termination messages are operable to modify information associated with the one or more requested programs.

2. The method of claim 1, further comprises replicating the one or more requested programs and providing copies of the replicated programs to the one or more set-top boxes.

3. The method of claim 1, further comprises determining mapping information associated with the one or more requested programs.

4. The method of claim 3, wherein the mapping information associated with the one or more requested programs includes at least one of mapping, storage location, identification information, transmission channel, frequency, and bandwidth/modulation associated with the one or more programs.

5. The method of claim 1, wherein the one or more programming content identification messages are provided by at least one of the linear content system and the digital content system.

6. The method of claim 1, wherein the one or more programming content identification messages are generated by the programming content server.

7. The method of claim 1, wherein the one or more termination messages are provided by at least one of the linear content system and the digital content system.

8. The method of claim 1, wherein the one or more termination messages are generated by the programming content server.

9. A non-transitory computer readable storage media comprising code to perform the acts of the method of claim 1.

10. A system, comprising:
a computer processor coupled to one or more networks;
wherein the computer processor is configured to:
receive a request for one or more programs;
transmit the request for one or more programs to at least one of a linear content system and a digital content system;
receive the one or more requested programs from at least one of the linear content system and the digital content system;
transmit one or more programming content identification messages to a set-top box in the event that the one or more requested programs extend over an allocated time slot, wherein the one or more programming content identification messages are transmitted during the allocated time slot of the one or more requested programs and indicates a change in the duration of the one or more requested programs, and wherein the one or more programming content identification messages are provided to a digital video recorder associated with the set-top box to modify a recording time of desired programming; and
transmit one or more termination messages to the set-top box at a termination of the one or more requested programs, wherein the one or more termination messages are operable modify information associated with the one or more requested programs.

11. The system of claim 10, wherein the computer processor is further configured to replicate the one or more requested programs and provide copies of the replicated programs to the one or more set-top boxes.

12. The system of claim 10, wherein the computer processor is further configured to determine mapping information associated with the one or more requested programs.

13. The system of claim 12, wherein the mapping information associated with the one or more requested programs includes at least one of mapping, storage location, identification information, transmission channel, frequency, and bandwidth/modulation associated with the one or more programs.

14. The system of claim 10, wherein the one or more programming content identification messages are provided by at least one of the linear content system and the digital content system.

15. The system of claim 10, wherein the one or more termination messages are provided by at least one of the linear content system and the digital content system.

16. The method of claim 1, wherein the information associated with the one or more requested programs and modified by the one or more termination messages comprises programming duration.

17. The method of claim 1, wherein the information associated with the one or more requested programs and modified by the one or more termination messages comprises program schedule information.

18. The system of claim 10, wherein the information associated with the one or more requested programs and modified by the con or more termination messages comprises programming duration.

19. The system of claim 10, wherein the information associated with the one or more requested programs and modified by the one or more termination messages comprises program schedule information.

\* \* \* \* \*